United States Patent
Yamamoto

(10) Patent No.: US 10,764,465 B2
(45) Date of Patent: Sep. 1, 2020

(54) DOCUMENT SCANNING APPARATUS COMMUNICABLE WITH SERVER FOR FILE MANAGEMENT, AND METHOD AND COMPUTER-READABLE MEDIUM THEREFOR

(71) Applicant: BROTHER KOGYO KABUSHIKI KAISHA, Nagoya, Aichi (JP)

(72) Inventor: Shunsuke Yamamoto, Okazaki (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/934,134

(22) Filed: Mar. 23, 2018

(65) Prior Publication Data

US 2018/0288272 A1    Oct. 4, 2018

(30) Foreign Application Priority Data

Mar. 28, 2017  (JP) .................................. 2017-063110

(51) Int. Cl.
| | |
|---|---|
| *H04N 1/32* | (2006.01) |
| *H04N 1/21* | (2006.01) |
| *H04N 1/00* | (2006.01) |
| *G06F 3/12* | (2006.01) |

(52) U.S. Cl.
CPC ......... *H04N 1/32454* (2013.01); *G06F 3/127* (2013.01); *H04N 1/00193* (2013.01); *H04N 1/00944* (2013.01); *H04N 1/2158* (2013.01); *H04N 1/2179* (2013.01); *H04N 1/00148* (2013.01); *H04N 1/00946* (2013.01)

(58) Field of Classification Search
CPC combination set(s) only.
See application file for complete search history.

(56) References Cited

U.S. PATENT DOCUMENTS

2001/0005846 A1* 6/2001 Barney ............... G06F 11/1435
2006/0044416 A1   3/2006 Miyazaki et al.
(Continued)

FOREIGN PATENT DOCUMENTS

| JP | 2005-244769 A | 9/2005 |
|---|---|---|
| JP | 2006-024306 A | 1/2006 |

(Continued)

*Primary Examiner* — Miya J Williams
(74) *Attorney, Agent, or Firm* — Scully Scott Murphy and Presser

(57) ABSTRACT

A document scanning apparatus includes a controller configured to control an image scanner to scan a document sheet, thereby generating scanned image data, control a communication interface to transmit, to a storage, an instruction for inquiring whether there is one or more pieces of image data stored in a folder of the storage, control the communication interface to receive data existence information representing whether there is one or more pieces of image data stored in the folder, when the data existence information represents that there is one or more pieces of image data stored in the folder, control the communication interface to transmit, to the storage, an instruction to remove the one or more pieces of image data from the folder, and control the communication interface to transmit, to the storage, an instruction to store the scanned image data generated by the image scanner, into the folder.

20 Claims, 9 Drawing Sheets

(56) References Cited

U.S. PATENT DOCUMENTS

| | | | | |
|---|---|---|---|---|
| 2008/0117472 | A1* | 5/2008 | Nohtomi | H01N 1/00244 |
| | | | | 358/403 |
| 2013/0254741 | A1* | 9/2013 | Spassov | G06F 8/71 |
| | | | | 717/110 |
| 2018/0205838 | A1* | 7/2018 | Nagarajan | H04N 1/00225 |

FOREIGN PATENT DOCUMENTS

| | | | |
|---|---|---|---|
| JP | 2006-072517 | A | 3/2006 |
| JP | 2008-177741 | A | 7/2006 |
| JP | 2008-131189 | A | 6/2008 |
| JP | 2011-141752 | A | 7/2011 |

* cited by examiner

DOCUMENT SCANNING APPARATUS COMMUNICABLE WITH SERVER FOR FILE MANAGEMENT, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2017-063110 filed on Mar. 28, 2017. The entire subject matter of the application is incorporated herein by reference.

BACKGROUND

Technical Field

Aspects of the present disclosure are related to a document scanning apparatus, and a method and a computer-readable medium therefor.

Related Art

A technique to store image data into a user folder for each individual user in a recording medium based on user identification information has been known. The known technique makes it easy for each user to sort and organize image data.

SUMMARY

However, in particular, when a plurality of pieces of image data are stored in a single folder, it might require much time and effort to find intended image data from among the plurality of pieces of image data.

Aspects of the present disclosure are advantageous to provide one or more techniques, for a document scanning apparatus, which make it possible to easily find intended image data even when a plurality of pieces of image data are stored.

According to aspects of the present disclosure, a document scanning apparatus is provided, which includes an image scanner, a communication interface configured to communicate with a storage, and a controller configured to perform a scanned-data storing process. The scanned-data storing process includes a scanning process to control the image scanner to scan a document sheet, thereby generating scanned image data, a first transmitting process to control the communication interface to transmit, to the storage, an instruction for inquiring of the storage whether there is one or more pieces of image data stored in a first folder of the storage, a first receiving process to control the communication interface to receive, from the storage, data existence information representing whether there is one or more pieces of image data stored in the first folder, a second transmitting process to, when the data existence information represents that there is one or more pieces of image data stored in the first folder, control the communication interface to transmit, to the storage, an instruction to remove the one or more pieces of image data from the first folder, and a data storing process to control the communication interface to transmit, to the storage, an instruction to store the scanned image data generated by the image scanner, into the first folder.

According to aspects of the present disclosure, further provided is a method implementable on a processor coupled with a document scanning apparatus. The document scanning apparatus includes an image scanner and a communication interface configured to communicate with a storage. The method includes controlling the image scanner to scan a document sheet, thereby generating scanned image data, controlling the communication interface to transmit, to the storage, an instruction for inquiring of the storage whether there is one or more pieces of image data stored in a specific folder of the storage, controlling the communication interface to receive, from the storage, data existence information representing whether there is one or more pieces of image data stored in the specific folder, when the data existence information represents that there is one or more pieces of image data stored in the specific folder, controlling the communication interface to transmit, to the storage, an instruction to remove the one or more pieces of image data from the specific folder, and controlling the communication interface to transmit, to the storage, an instruction to store the scanned image data generated by the image scanner, into the specific folder.

According to aspects of the present disclosure, further provided is a non-transitory computer-readable medium storing computer-readable instructions that are executable by a processor coupled with a document scanning apparatus. The document scanning apparatus includes an image scanner and a communication interface configured to communicate with a storage. The instructions are configured to, when executed by the processor, cause the processor to perform a scanned-data storing process. The scanned-data storing process includes a scanning process to control the image scanner to scan a document sheet, thereby generating scanned image data, a first transmitting process to control the communication interface to transmit, to the storage, an instruction for inquiring of the storage whether there is one or more pieces of image data stored in a specific folder of the storage, a first receiving process to control the communication interface to receive, from the storage, data existence information representing whether there is one or more pieces of image data stored in the specific folder, a second transmitting process to, when the data existence information represents that there is one or more pieces of image data stored in the specific folder, control the communication interface to transmit, to the storage, an instruction to remove the one or more pieces of image data from the specific folder, and a data storing process to control the communication interface to transmit, to the storage, an instruction to store the scanned image data generated by the image scanner, into the specific folder.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

<Configuration of Document Scanning Apparatus>

Figure 1:
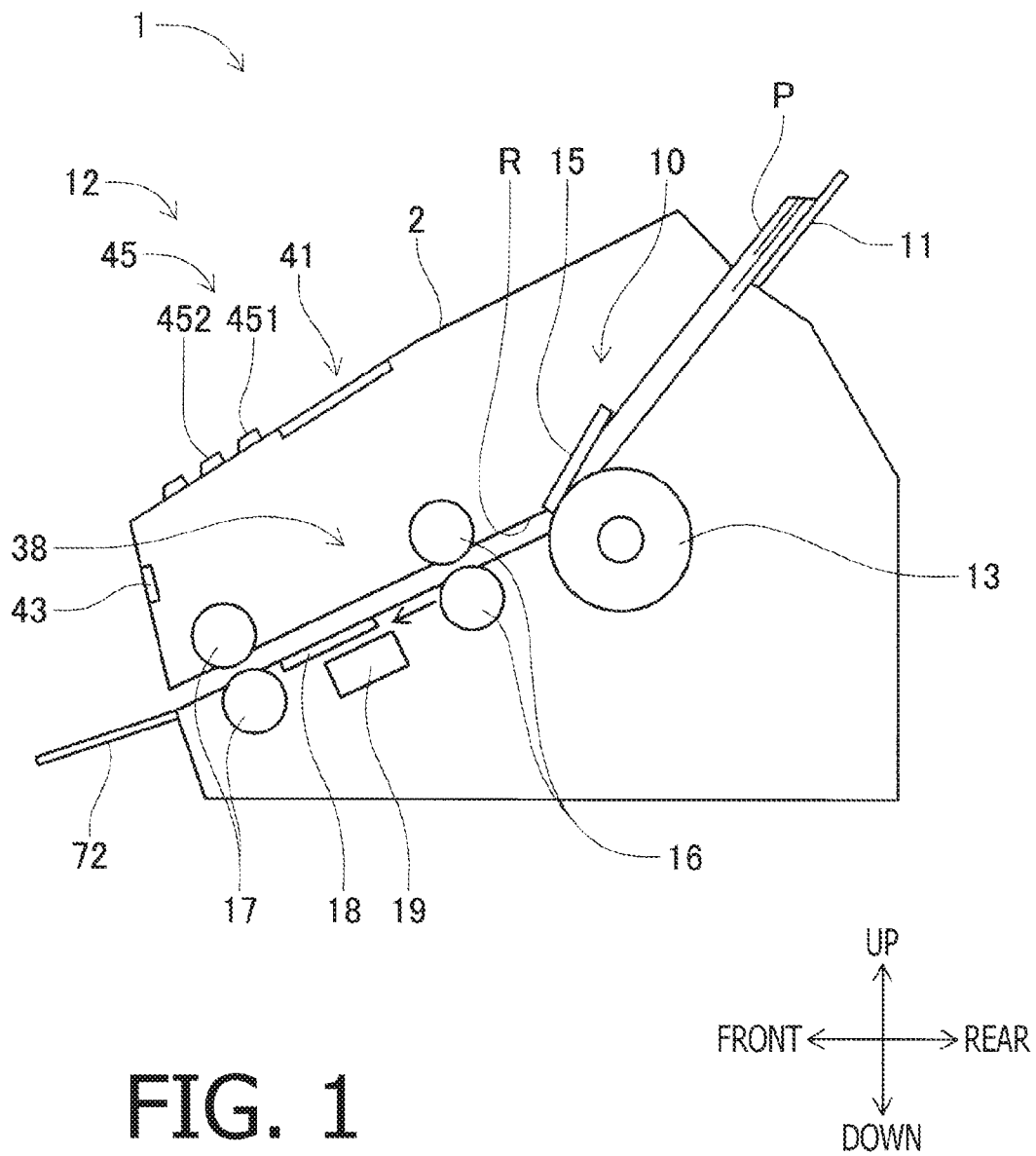
FIG. 1 is a cross-sectional side view schematically showing a configuration of a document scanning apparatus in a first illustrative embodiment according to one or more aspects of the present disclosure.

Referring to FIG. 1, a configuration of a document scanning apparatus 1 in a first illustrative embodiment according to aspects of the present disclosure will be described. In the following description, directions of the document scanning apparatus 1 will be defined as shown in FIG. 1. The document scanning apparatus 1 includes a housing 2, a feed tray 11, a discharge tray 72, and an operation panel 12. The housing 2 is formed substantially in a box shape. The housing 2 is configured to accommodate a document feeder 10 and an image scanner 38. The feed tray 11 is configured to support one or more document sheets P placed thereon.

The document feeder 10 includes a pickup roller 13, a separation pad 15, and conveyance rollers 16 and 17. The pickup roller 13 is configured to feed, along a conveyance path R, the one or more document sheets P placed on the feed tray 11. The pickup roller 13 and the separation pad 15 are configured to convey the one or more document sheets P fed by the pickup roller 13, toward the conveyance rollers 16 along the conveyance path R on a sheet-by-sheet basis.

The image scanner 38 is disposed in front of the document feeder 10. The image scanner 38 includes a platen glass 18 and a sensor 19. The platen glass 18 is optically transparent. Below the conveyance path R, the platen glass 18 is disposed along the conveyance path R. The sensor 19 is disposed under the platen glass 18. The sensor 19 includes a light source (not shown) and a light receiver (not shown). The sensor 19 is configured to scan images of the one or more document sheets P via the platen glass 18.

The operation panel 12 includes an LCD 41 and operable buttons 45. The operable buttons 45 include a menu button 451, a start button 452, a power button (not shown), an OK button (not shown), and a numeric keypad (not shown). A USB receptacle 43 is disposed at a front face of the housing 2. The USB receptacle 43 is a receptacle complying with USB standards.

<Electrical Configuration of Document Scanning Apparatus>

Figure 2:
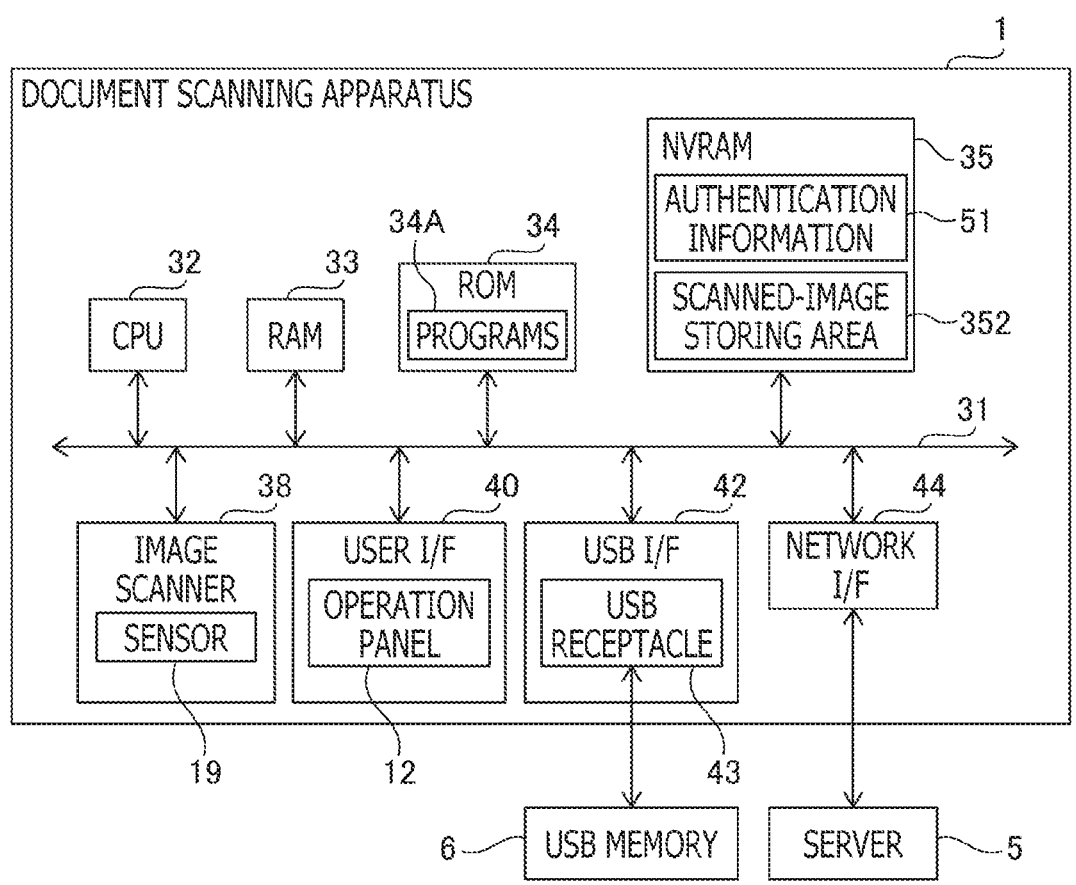
FIG. 2 is a block diagram schematically showing an electrical configuration of the document scanning apparatus in the first illustrative embodiment according to one or more aspects of the present disclosure.

Subsequently, referring to FIG. 2, an electrical configuration of the document scanning apparatus 1 will be described. The document scanning apparatus 1 includes a CPU 32, a RAM 33, a ROM 34, an NVRAM (a non-volatile memory) 35, the image scanner 38, a user interface (hereinafter referred to as a "user I/F") 40, a USB interface (hereinafter referred to as a "USB I/F") 35, and a network interface (hereinafter referred to as a "network I/F") 44, as well as the aforementioned elements shown in FIG. 1. The ROM 34 stores programs 34A for executing processes such as a below-mentioned storing process. The CPU 32 is configured to control each element connected with a bus 31 while executing one or more programs 34A read out of the ROM 34 and storing processing results into the RAM 33. The NVRAM 35 stores authentication information 51. Further, a partial area of the NVRAM 35 is allocated as a scanned-image storing area 352 to store image data scanned by the image scanner 38.

The user I/F 40 is configured to display various setting screens and an operating state of the apparatus 1 on the LCD 41. Further, the user I/F 40 is configured to transmit, to the CPU 32, a signal corresponding to a user operation accepted via the operable buttons 45. Specifically, in response to the start button 452 being pressed, the user I/F 40 transmits a start signal to the CPU 32. Thereby, the CPU 32 determines that the start button 452 has been pressed. Further, in response to the menu button 451 being pressed, the user I/F 40 transmits to the CPU 32 a signal corresponding to the pressing of the menu button 451. Thereby, the CPU 32 determines that the menu button 451 has been pressed. The USB I/F 42 is configured to perform communication complying with a communication protocol for USB, with a USB memory 6 attached to the USB receptacle 43. Further, in response to detecting that the USB memory 6 has been attached to the USB receptacle 43, the USB I/F 42 transmits to the CPU 32 a signal corresponding to the attachment of the USB memory 6. Thereby, the CPU 32 determines that the USB memory 6 has been attached to the USB receptacle 43. Likewise, in response to detecting that the USB memory 6 has been detached from the USB receptacle 43, the USB I/F 42 transmits to the CPU 32 a signal corresponding to the detachment of the USB memory 6. Thereby, the CPU 32 determines that the USB memory 6 has been detached from the USB receptacle 43. The network I/F 44 may perform wireless LAN communication with a server 5 connected with a wireless LAN.

A Scan-to-USB function is a function to store image data scanned by the image scanner 38 into a USB memory 6. A Scan-to-Server function is a function to store image data scanned by the image scanner 38 into the server 5.

<Storing Process>

In response to determining that the menu button 451 has been pressed, the CPU 32 controls the LCD 41 to display a function selecting screen (not shown). The function selecting screen includes a Scan-to-USB button and a Scan-to-Server button displayed thereon. In response to the Scan-to-USB button being selected, the user I/F 40 transmits to the CPU 32 a signal corresponding to the selection of the Scan-to-USB button. Thereby, the CPU 32 determines that the Scan-to-USB button has been selected. Likewise, in response to the Scan-to-Server button being selected, the user I/F 40 transmits to the CPU 32 a signal corresponding to the selection of the Scan-to-Server button. Thereby, the CPU 32 determines that the Scan-to-Server button has been selected.

Figure 3:
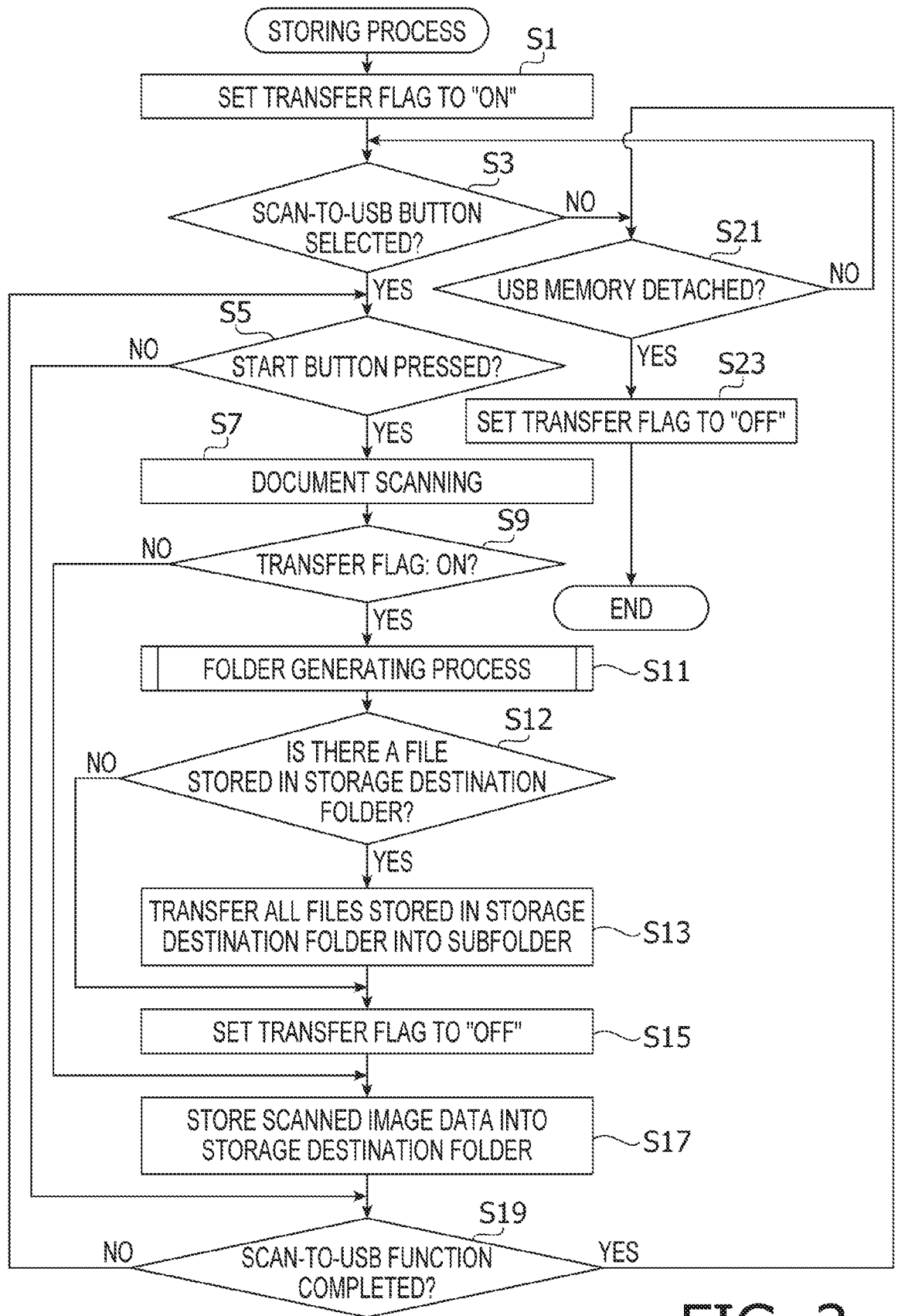
FIG. 3 is a flowchart showing a procedure of a storing process in the first illustrative embodiment according to one or more aspects of the present disclosure.

A user selects the Scan-to-USB button via the operation panel 12, and attaches a USB memory 6 to the USB receptacle 43. After displaying the function selecting screen, the CPU 32 determines whether a USB memory 6 is attached to the USB receptacle 43. In response to determining that a USB memory 6 is attached to the USB receptacle 43, the CPU 32 starts a storing process shown in FIG. 3. In the storing process, first, the CPU 32 sets a transfer flag to "ON" (S1). The transfer flag is used for the CPU 32 to determine whether pressing of the start button 452 is the first pressing of the start button 452 after the USB memory 6 has been attached to the USB receptacle 43. Subsequently, the CPU 32 determines whether the Scan-to-USB button has been selected (S3). When determining that the Scan-to-USB button is not selected (S3: No), the CPU 32 goes to S21. Meanwhile, when determining that the Scan-to-USB button has been selected (S3: Yes), the CPU 32 determines whether the start button 45 has been pressed (S5). When determining that the start button 45 has not been pressed (S5: No), the CPU 32 goes to S19. Meanwhile, when determining that the start button 45 has been pressed (S5: Yes), the CPU 32 controls the image scanner 38 to scan document sheets P, thereby generating scanned image data, and stores the scanned image data into the scanned-image storing area 352 of the NVRAM 35 (S7). Next, the CPU 32 determines whether the transfer flag is "ON" (S9). When determining that the transfer flag is not "ON" (S9: No), the CPU 32 goes to S17. Meanwhile, when determining that the transfer flag is "ON" (S9: Yes), the CPU 32 determines that the pressing of the start button 452 is the first pressing of the start button 452 after the USB memory 6 has been attached to the USB receptacle 43, and performs a folder generating process (S11).

Figure 4:
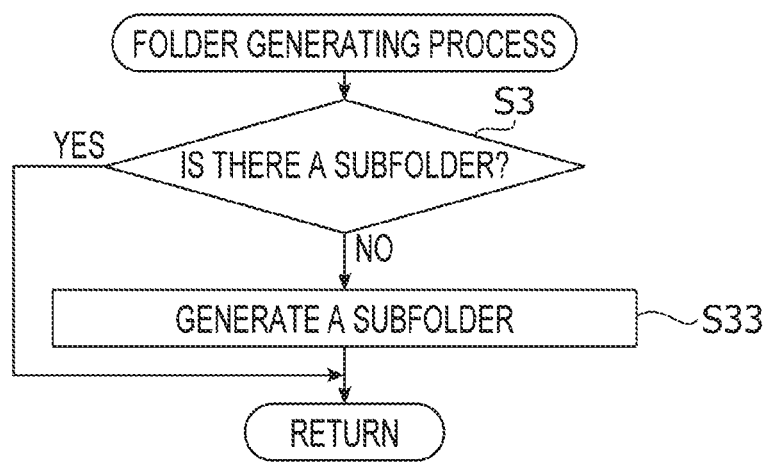
FIG. 4 is a flowchart showing a procedure of a folder generating process in the first illustrative embodiment according to one or more aspects of the present disclosure.
Figure 5:
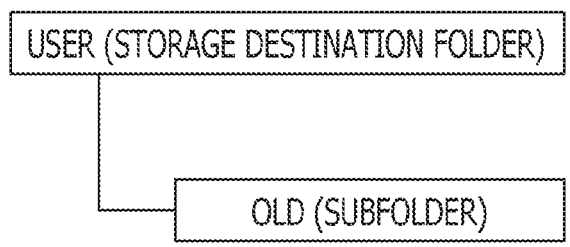
FIG. 5 shows a folder configuration in the first illustrative embodiment according to one or more aspects of the present disclosure.

The folder generating process will be described with reference to FIG. 4. First, the CPU 32 determines whether there is a subfolder (S31). Specifically, the CPU 32 controls the USB I/F 42 to transmit, to the USB memory 6, an instruction for inquiring of the USB memory 6 whether there is an Old folder as a subfolder of a User folder in the USB memory 6. Next, the CPU 32 controls the USB I/F 42 to receive, from the USB memory 6, subfolder information representing whether there is an Old folder. When the subfolder information represents that there is an Old folder, the CPU 32 determines that there is a subfolder. Meanwhile, when the subfolder information represents that there is not an Old folder, the CPU 32 determines that there is not a subfolder. In the storing process of the first illustrative embodiment, as shown in FIG. 5, the CPU 32 causes the USB memory 6 to structure a folder configuration having an Old folder under the User folder. The CPU 32 stores latest scanned image data in the User folder, and stores past scanned image data in the Old folder. Specifically, in order to store new scanned image data into the USB memory 6, the CPU 32 transfers scanned image data stored in the User folder into the Old folder (i.e., the CPU 32 removes scanned image data from the User folder and transfers the removed data into the Old folder), and stores the new scanned image data into the User folder.

When determining that there is not an Old folder as a subfolder in the User folder (S31: No), the CPU 32 controls the USB I/F 42 to transmit, to the USB memory 6, an instruction to generate an Old folder as a subfolder in the User folder as a storage destination folder (S33). Thereafter, the CPU 32 terminates the folder generating process and returns to the storing process (see FIG. 3). Meanwhile, when determining that there is an Old folder as a subfolder (S31: Yes), the CPU 32 terminates the folder generating process without executing S33, and returns to the storing process.

Referring back to FIG. 3, after execution of S11, the CPU 32 determines whether there is an image file stored in the User folder as the storage destination folder (S12). It is noted that the "image file" is an electronic file generated from image data (e.g., scanned image data). Specifically, the CPU 32 controls the USB I/F 42 to transmit, to the USB memory 6, an instruction for inquiring of the USB memory 6 whether there is an image file stored in the User folder of the USB memory 6. Subsequently, the CPU 32 controls the USB I/F 42 to receive, from the USB memory 6, file existence information representing whether an image file exists in the User folder. When the file existence information represents that an image file exists in the User folder, the CPU 32 determines that there is an image file stored in the User folder. Meanwhile, when the file existence information represents that no image file exists in the User folder, the CPU 32 determines that there is not an image file stored in the User folder. When determining that there is an image file stored in the User folder (S12: Yes), the CPU 32 transfers all image files stored in the User folder into the Old folder (S13). Specifically, the CPU 32 controls the USB I/F 42 to transmit, to the USB memory 6, an instruction to transfer all image files stored in the User folder into the Old folder. Thereafter, the CPU 32 goes to S15. Meanwhile, when determining that there is not an image file stored in the User folder (S12: No), the CPU 32 goes to S15.

The CPU 32 sets the transfer flag to "OFF" (S15). Subsequently, the CPU 32 stores the new scanned image data into the User folder as the storage destination folder (S17). Specifically, the CPU 32 generates an image file from the scanned image data stored in the scanned-image storing area 352, and provides the image file with a file name including a date and a file number. The file number is a serial number provided when the image file is stored. The file number is a 3-digit natural number. The latest file number is stored in the NVRAM 35. For instance, a file name of the first image file stored on Jan. 1, 2017 is "20170101001." Next, the CPU 32 controls the USB I/F 42 to transmit, to the USB memory 6, an instruction to store the image file into the User folder. Thereby, the image file is generated from the scanned image data, and then stored into the User folder. Subsequently, the CPU 32 determines whether the Scan-to-USB function has been completed (S19). When determining that the menu button 451 has been pressed, the CPU 32 determines that the user does not have an intention to use the Scan-to-USB function and that the Scan-to-USB function has been completed. Meanwhile, when determining that the menu button 451 has not been pressed, the CPU 32 determines that the Scan-to-USB function has not been completed. When determining that the Scan-to-USB function has not been completed (S19: No), the CPU 32 goes back to S5 to scan a next set of document sheets P. Meanwhile, when determining that the Scan-to-USB function has been completed (S19: Yes), the CPU 32 determines whether the USB memory 6 is detached from the USB receptacle 43 (S21). When determining that the USB memory 6 is not detached from the USB receptacle 43 (S21: No), the CPU 32 determines that the user may select the Scan-to-USB button, and goes back to S3. Meanwhile, When determining that the USB memory 6 is detached from the USB receptacle 43 (S21: Yes), the CPU 32 sets the transfer flag to "OFF" (S32). Afterward, the CPU 32 terminates the storing process.

The aforementioned first illustrative embodiment provides the following advantageous effects. In S7, the CPU 32 controls the image scanner 38 to scan document sheets P, thereby generating scanned image data. Further, in S12, the CPU 32 controls the USB I/F 42 to transmit, to the USB memory 6, an instruction for inquiring of the USB memory 6 whether there is an image file stored in the User folder of the USB memory 6, and then controls the USB I/F 42 to receive, from the USB memory 6, the file existence information representing whether an image file exists in the User folder. Further, in S13, the CPU 32 controls the USB I/F 42 to transmit, to the USB memory 6, an instruction to transfer the image file stored in the User folder into the Old folder that is a subfolder of the User folder. Further, in S17, the CPU 32 controls the USB I/F 42 to transmit, to the USB memory 6, an instruction to store an image file of the new scanned image data into the User folder. Thereby, the image file of the latest scanned image data is stored into the User folder. Thus, the user is allowed to easily find the latest scanned image data.

Further, when determining that a signal corresponding to pressing of the start button 452 has been input (S5: Yes), the CPU 32 determines whether the transfer flag is "ON" (S9). When determining that the transfer flag is not "ON" (S9: No), the CPU 32 determines that the pressing of the start button 452 is not the first pressing of the start button 452 after the USB memory 6 has been attached to the USB receptacle 43, and skips S12 and S13. Thus, in a procedure from when the CPU 32 executes S7 for the second time after the USB memory 6 has been attached to the USB receptacle 43, even when there is an image file stored in the User folder, the image file stored in the User folder is not transferred into the Old folder. Thereby, when the user wishes to save a plurality of image files in the User folder, one or more image files of image data scanned after the USB memory 6 has been attached may be stored and accumulated in the User folder. Therefore, the first illustrative embodiment provides such a user-friendly document scanning apparatus 1.

Further, in S31, the CPU 32 controls the USB I/F 42 to transmit, to the USB memory 6, an instruction for inquiring of the USB memory 6 whether there is a subfolder in the User folder of the USB memory 6, and controls the USB I/F 42 to receive, from the USB memory 6, subfolder information representing whether there is a subfolder in the User folder. When the subfolder information represents that there is not a subfolder, in S33, the CPU 32 controls the USB I/F 42 to transmit, to the USB memory 6, an instruction to generate an Old folder as a subfolder in the User folder. Thereby, even when there is no subfolder in the User folder, the CPU 32 may cause the USB memory 6 to generate a subfolder in the User folder.

[Storing Process in Second Illustrative Embodiment]

Figure 6A:
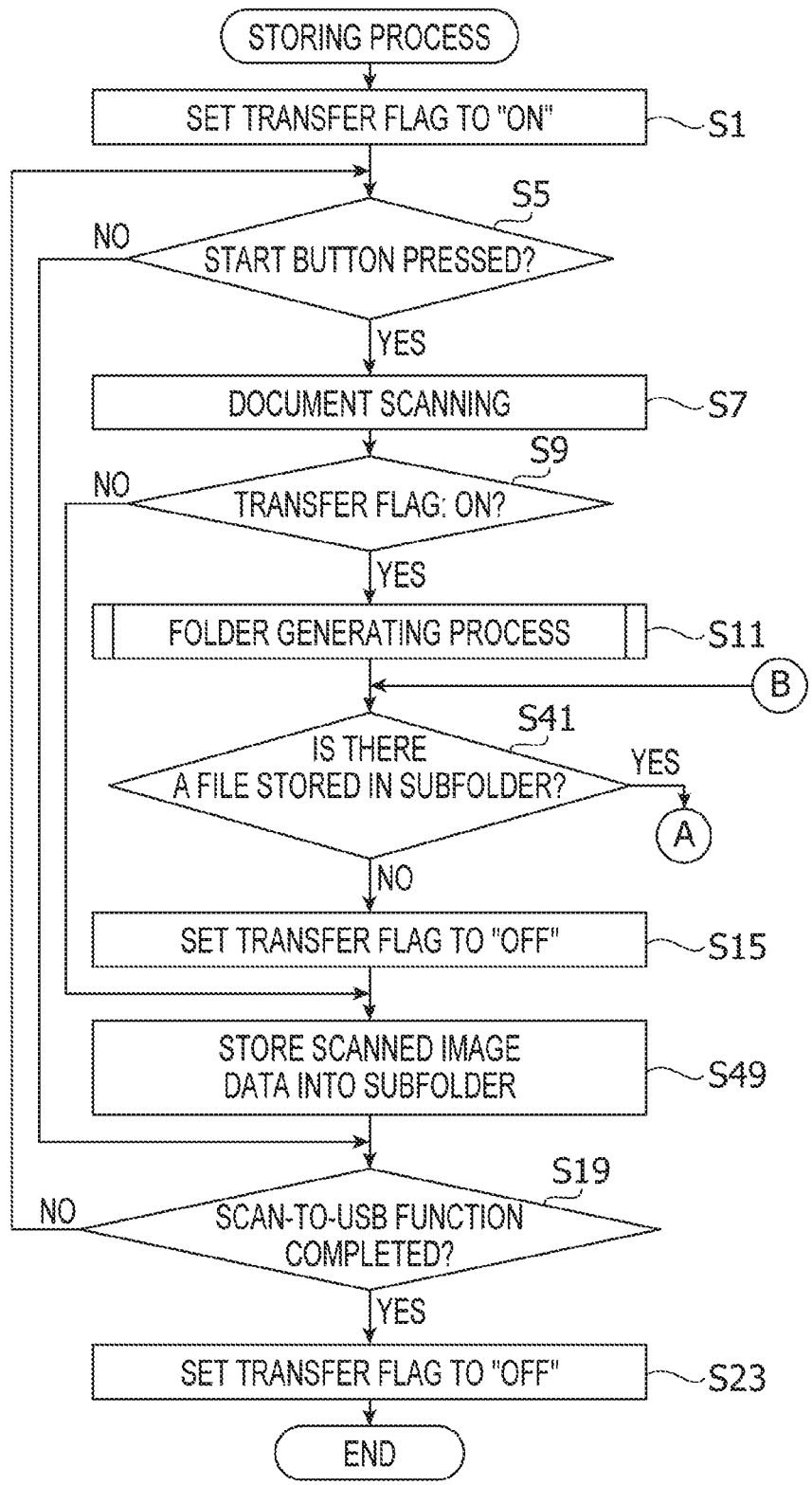
FIGS. 6A and 6B are flowcharts showing a procedure of a storing process in a second illustrative embodiment according to one or more aspects of the present disclosure.
Figure 6B:
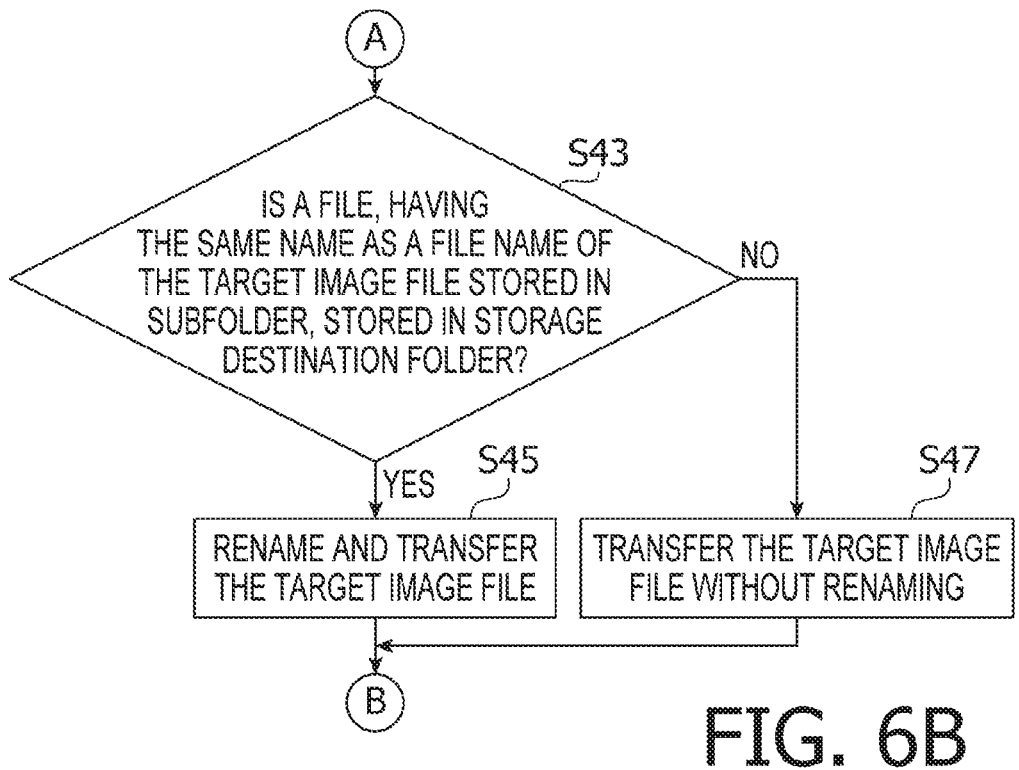

Referring to FIGS. 6A and 6B, a storing process in a second illustrative embodiment according to aspects of the present disclosure will be described. When determining that the menu button 451 has been pressed, the CPU 32 controls the LCD 41 to display a function selecting screen (not shown). The function selecting screen includes a Scan-to-USB button and a Scan-to-Server button displayed thereon. The user attaches a USB memory 6 to the USB receptacle 43 and selects the Scan-to-USB button. After issuance of an instruction to display the function selecting screen, the CPU 32 determines whether a USB memory 6 has been attached to the USB receptacle 43. When determining that a USB memory 6 has been attached to the USB receptacle 43, the CPU 32 determines whether the Scan-to-USB button has been selected via the function selecting screen. When determining that the Scan-to-USB button has been selected via the function selecting screen, the CPU 32 starts the storing process. In the following description, substantially the same steps as exemplified in the aforementioned first illustrative embodiment will be provided with the same reference characters, and detailed explanations thereof may be omitted.

First, the CPU 32 sets a transfer flag to "ON" (S1). In the second illustrative embodiment, the transfer flag is used for the CPU 32 to determine whether pressing of the start button 452 is the first pressing of the start button 452 after the Scan-to-USB function has been selected. Subsequently, the CPU 32 determines whether the start button 452 has been pressed (S5). When determining that the start button 452 has not been pressed (S5: No), the CPU 32 goes to S19. Meanwhile, when determining that the start button 452 has been pressed (S5: Yes), the CPU 32 controls the image scanner 38 to scan document sheets P, thereby generating scanned image data (S7). Next, the CPU 32 determines whether the transfer flag is "ON" (S9). When determining that the transfer flag is not "ON" (S9: No), the CPU 32 goes to S49. Meanwhile, when determining that the transfer flag is "ON" (S9: Yes), the CPU 32 determines that the pressing of the start button 452 is the first pressing of the start button 452 after the Scan-to-USB function has been selected, and performs a folder generating process (S11).

Figure 7:
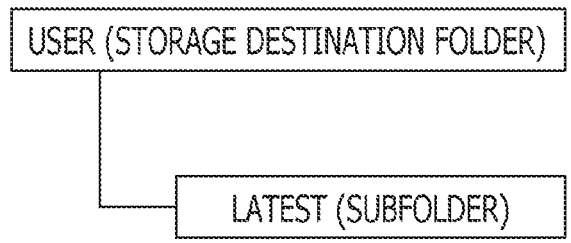
FIG. 7 shows a folder configuration in the second illustrative embodiment according to one or more aspects of the present disclosure.

In the storing process of the second illustrative embodiment, as shown in FIG. 7, the CPU 32 structures, in the USB memory 6, a folder configuration having a Latest folder under a User folder. The CPU 32 stores latest scanned image data in the Latest folder, and stores past scanned image data in the User folder. Specifically, in order to store new scanned image data into the USB memory 6, the CPU 32 transfers scanned image data stored in the Latest folder into the User folder (i.e., the CPU 32 removes scanned image data from the Latest folder and transfers the removed data into the User folder), and stores the new scanned image data into the Latest folder. In the folder generating process (S11), when determining that there is not a Latest folder as a subfolder in the User folder (S31: No), the CPU 32 causes the USB memory 6 to generate a Latest folder as a subfolder in the User folder as a storage destination folder.

Subsequently, the CPU 32 determines whether there is an image file stored in the Latest folder (S41). Specifically, the CPU 32 controls the USB I/F 42 to transmit, to the USB memory 6, an instruction for inquiring of the USB memory 6 whether there is an image file stored in the Latest folder of the USB memory 6. Next, the CPU 32 controls the USB I/F 42 to receive, from the USB memory 6, file existence information representing whether an image file exists in the Latest folder. When the file existence information represents that an image file exists in the Latest folder, the CPU 32 determines that there is an image file stored in the Latest folder. Meanwhile, when the file existence information represents that no image file exists in the Latest folder, the CPU 32 determines that there is not an image file stored in the Latest folder.

In a case where an image file, which has the same name as a file name of an image file stored in the User folder, exists in the Latest folder, there is a need to change the file name of the image file in the Latest folder. Therefore, when determining that there is an image file stored in the Latest folder (S41: Yes), the CPU 32 performs the following steps S43 to S47. When determining that there is an image file stored in the Latest folder (S41: Yes), the CPU 32 sets, as a target image file, an image file stored in the Latest folder, and determines whether an image file having the same name as a file name of the target image file is stored in the User folder (S43). Specifically, the CPU 32 controls the USB I/F 42 to transmit, to the USB memory 6, an instruction to transmit data name information containing file names of image files stored in the User folder and the Latest folder. Next, the CPU 32 controls the USB I/F 42 to receive the data name information from the USB memory 6. Subsequently, based on the received data name information, the CPU 32 determines whether an image file, of which a file name is coincident with the file name of the target image file, is stored in the User folder. When determining that an image file, of which a file name is coincident with the file name of the target image file, is stored in the User folder, the CPU 32 determines that an image file having the same name as the file name of the target image file is stored in the User folder. Meanwhile, when determining that an image file, of which a file name is coincident with the file name of the target image file, is not stored in the User folder, the CPU 32 determines that no image file having the same name as the file name of the target image file is stored in the User folder.

When determining that an image file having the same name as the file name of the target image file is stored in the User folder (S43: Yes), in order to prevent the two image files from sharing the same name, the CPU 32 renames the target image file, and transfers the target image file into the User folder (S45). Then, the CPU 32 goes back to S41. Specifically, in S45, based on the data name information, the CPU 32 detects, in the User folder, a maximum number from among file numbers of file names of the same date as a date of the target image file. Then, the CPU 32 uses a file number obtained by adding one to the detected maximum number, for the changed file name of the target image file. Suppose for instance that the file name of the target image file stored in the Latest folder is "20161231001," and file names of ten image files stored in the User folder are "20161231001" to "20161231010." In this case, the file name of the target image file stored in the Latest folder is changed from "20161231001" to "20161231011." Subsequently, the CPU 32 controls the USB I/F 42 to transmit, to the USB memory 6, an instruction to rename and transfer the target image file stored in the Latest folder into the User folder. For instance, when the USB memory 6 is used by a plurality of users, an image file having the same file name as a file name of an image file stored in the User folder may be stored into the Latest folder. Even in such a case, by executing S45, the CPU 32 efficiently makes an image file transfer.

Meanwhile, when determining that an image file having the same name as the file name of the target image file is not stored in the User folder (S43: No), since there is no need to rename the target image file, the CPU 32 transfers the target image file into the User folder without renaming the target image file (S47). Then, the CPU 32 goes back to S41. Specifically, in S47, the CPU 32 controls the USB I/F 42 to transmit, to the USB memory 6, an instruction to transfer the target image file stored in the Latest folder into the User folder. Thus, when a plurality of image files are stored in the Latest folder, the CPU 32 repeatedly executes the steps S41 and S43 and the step S45 or S47 until all of the image files stored in the Latest folder are transferred into the User folder.

When all of the image files stored in the Latest folder are transferred into the User folder, and the CPU 32 determines that there is not an image file stored in the Latest folder (S41: No), the CPU 32 sets the transfer flag to "OFF" (S15). Then, the CPU 32 provides the scanned image data with a file name, and stores the scanned image data into the Latest folder (S49). Specifically, the CPU 32 controls the USB I/F 42 to transmit, to the USB memory 6, an instruction to store a newly-generated image file into the Latest folder. Next, the CPU 32 determines whether the Scan-to-USB function has been completed (S19). When determining that the Scan-to-USB function has not been completed (S19: No), the CPU 32 goes back to S5 to scan a next set of document sheets P. Meanwhile, when determining that the Scan-to-USB function has been completed (S19: Yes), the CPU 32 sets the transfer flag to "OFF" (S23). Thereafter, the CPU 32 terminates the storing process.

The aforementioned second illustrative embodiment provides the following advantageous effects. In S7, the CPU 32 controls the image scanner 38 to scan document sheets P, thereby generating scanned image data. Further, in S41, the CPU 32 controls the USB I/F 42 to transmit, to the USB memory 6, an instruction for inquiring of the USB memory 6 whether there is an image file stored in the Latest folder as a subfolder of the User folder in the USB memory 6, and controls the USB I/F 42 to receive the file existence information from the USB memory 6. Further, in S45 or S47, the CPU 32 controls the USB I/F 42 to transmit, to the USB memory 6, an instruction to transfer an image file stored in the Latest folder into the User folder. Further, in S49, the CPU 32 controls the USB I/F 42 to transmit, to the USB memory 6, an instruction to store an image file of the scanned image data into the User folder. Thus, since the image file of the latest scanned image data is stored into the Latest folder, the user is allowed to easily find the latest scanned image data.

Further, when determining that a signal corresponding to pressing of the start button 452 has been input (S5: Yes), the CPU 32 determines whether the transfer flag is "ON" (S9). When determining that the transfer flag is not "ON" (S9: No), the CPU 32 determines that the pressing of the start button 452 is not the first pressing of the start button 452 after the Scan-to-USB button has been selected, and skips S12 and S13. Thus, in a procedure from when the CPU 32 executes S7 for the second time after the Scan-to-USB button has been selected, even when there is an image file stored in the Latest folder, the image file stored in the Latest folder is not transferred into the User folder. Thereby, when the user wishes to save a plurality of image files in the Latest folder, one or more image files of image data scanned after the Scan-to-USB button has been selected may be stored and accumulated in the Latest folder. Therefore, the second illustrative embodiment provides such a user-friendly document scanning apparatus 1.

Further, in S43, the CPU 32 controls the USB I/F 42 to transmit, to the USB memory 6, an instruction to transmit data name information containing file names of image files stored in the User folder and the Latest folder, and controls the USB I/F 42 to receive the data name information from the USB memory 6. Further, in S43, the CPU 32 determines whether a file name of an image file stored in the User folder is coincident with a file name of an image file stored in the Latest folder. When determining that a file name of an image file stored in the User folder is coincident with a file name of an image file (i.e., a target image file) stored in the Latest folder (S43: Yes), in S45, the CPU 32 creates a file name that is not shared by any image file stored in the User folder, as a new file name of the target image file stored in the Latest folder. Further, the CPU 32 changes the file name of the target image file stored in the Latest folder to the new file name, and transfers the target image file into the User folder. Thereby, even when an image file having the same file name as a file name of an image file stored in the User folder is stored in the Latest folder, the CPU 32 may efficiently transfer the image file stored in the Latest folder into the User folder.

[Storing Process in Third Illustrative Embodiment]

Figure 8:
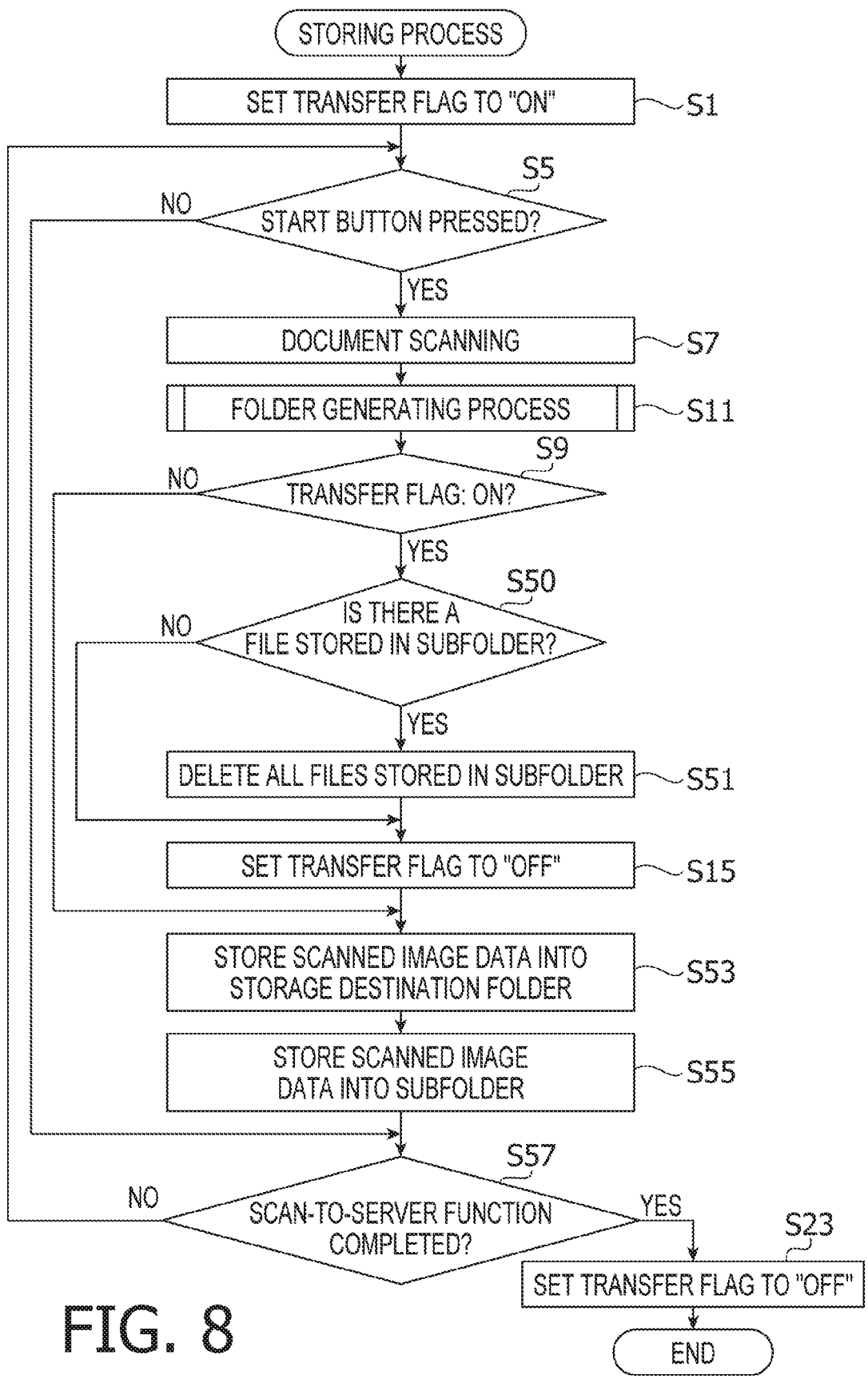
FIG. 8 is a flowchart showing a procedure of a storing process in a third illustrative embodiment according to one or more aspects of the present disclosure.

Referring to FIG. 8, a storing process in a third illustrative embodiment according to aspects of the present disclosure will be described. When determining that the menu button 451 has been pressed, the CPU 32 controls the LCD 41 to display a function selecting screen (not shown). The function selecting screen includes a Scan-to-USB button and a Scan-to-Server button displayed thereon. The user may select the Scan-to-Server button. After controlling the LCD 41 to display the function selecting screen, the CPU 32 determines whether the Scan-to-Server button has been selected. When determining that the Scan-to-Server button has been selected, the CPU 32 begins to communicate with the server 5 via the network OF 44, and starts the storing process. In the following description, substantially the same steps as exemplified in the aforementioned first illustrative embodiment will be provided with the same reference characters, and detailed explanations thereof may be omitted.

First, the CPU 32 sets a transfer flag to "ON" (S1). In the third illustrative embodiment, the transfer flag is used for the CPU 32 to determine whether pressing of the start button 452 is the first pressing of the start button 452 after the Scan-to-Server button function has been selected. Subsequently, the CPU 32 determines whether the start button 452 has been pressed (S5). When determining that the start button 452 has not been pressed (S5: No), the CPU 32 goes to S57. Meanwhile, when determining that the start button 452 has been pressed (S5: Yes), the CPU 32 controls the image scanner 38 to scan document sheets P, thereby generating scanned image data (S7). Next, the CPU 32 performs a folder generating process (S11). In the storing process of the third illustrative embodiment, as shown in FIG. 7, the CPU 32 structures, in the server 5, a folder configuration having a Latest folder under a User folder. The CPU 32 stores a latest image file into the Latest folder, and stores all image files into the User folder as a history of image files stored in the server 5. Specifically, in order to store new scanned image data into the server 5, the CPU 32 deletes scanned image data stored in the Latest folder (i.e., the CPU 32 removes scanned image data from the Latest folder and deletes the removed data), and stores the new scanned image data into both the Latest folder and the User folder. In the folder generating process (S11), when determining that there is not a Latest folder as a subfolder in the User folder (S31: No), the CPU 32 causes the server 5 to generate a Latest folder as a subfolder in the User folder as a storage destination folder.

Subsequently, the CPU 32 determines whether the transfer flag is "ON" (S9). When determining that the transfer flag is not "ON" (S9: No), the CPU 32 goes to S53. Meanwhile, when determining that the transfer flag is "ON" (S9: Yes), the CPU 32 determines that the pressing of the start button 452 is the first pressing of the start button 452 after the CPU 32 has begun to communicate with the server 5, and therefore determines whether there is an image file stored in the Latest folder as a subfolder (S50). Specifically, the CPU 32 controls the network I/F 44 to transmit, to the server 5, an instruction for inquiring of the server 5 whether there is an image file stored in the Latest folder as a subfolder of the User folder that is a storage destination folder in the server 5. Next, the CPU 32 controls the network I/F 44 to receive, from the server 5, file existence information representing whether an image file exists in the Latest folder. When the file existence information represents that an image file exists in the Latest folder, the CPU 32 determines that there is an image file stored in the Latest folder. Meanwhile, when the file existence information represents that no image file exists in the Latest folder, the CPU 32 determines that there is not an image file stored in the Latest folder.

When determining that there is not an image file stored in the Latest folder (S50: No), the CPU 32 goes to S15. Meanwhile, when determining that there is an image file stored in the Latest folder (S50: Yes), the CPU 32 deletes all image files stored in the Latest folder (S51). Specifically, the CPU 32 controls the network I/F 44 to transmit, to the server 5, an instruction to delete all image files stored in the Latest folder. Next, the CPU 32 sets the transfer flag to "OFF" (S15). Then, the CPU 32 stores, into the User folder, an image file generated from the scanned image data (S53). Specifically, the CPU 32 controls the network I/F 44 to transmit, to the server 5, an instruction to store the image file into the User folder of the server 5. Subsequently, the CPU 32 stores, into the Latest folder, the image file generated from the scanned image data (S55). Specifically, the CPU 32 controls the network I/F 44 to transmit, to the server 5, an instruction to store the image file into the Latest folder. Next, the CPU 32 determines whether the Scan-to-Server function has been completed (S57). When determining that the menu button 451 has been pressed, the CPU 32 determines that the user does not have an intention to use the Scan-to-Server function and that the Scan-to-Server function has been completed. Meanwhile, when determining that the menu button 451 has not been pressed, the CPU 32 determines that the Scan-to-Server function has not been completed. When determining that the Scan-to-Server function has not been completed (S57: No), the CPU 32 goes back to S5 to scan a next set of document sheets P. Meanwhile, when determining that the Scan-to-Server function has been completed (S57: Yes), the CPU 32 sets the transfer flag to "OFF" (S23). Thereafter, the CPU 32 terminates the storing process.

The aforementioned third illustrative embodiment provides the following advantageous effects. In S7, the CPU 32 controls the image scanner 38 to scan document sheets P, thereby generating scanned image data. Further, in S50, the CPU 32 controls the network I/F 44 to transmit, to the server 5, an instruction for inquiring of the server 5 whether there is an image file stored in the Latest folder as a subfolder of the User folder in the server 5, and controls the network I/F 44 to receive file existence information from the server 5. Further, in S51, the CPU 32 controls the network I/F 44 to transmit, to the server 5, an instruction to delete an image file stored in the Latest folder. Further, in S53, the CPU 32 controls the network I/F 44 to transmit, to the server 5, an instruction to store an image file of scanned image data into the User folder. Further, in S55, the CPU 32 controls the network I/F 44 to transmit, to the server 5, an instruction to store the image file of the scanned image data into the Latest folder. Thereby, the image file of the latest scanned image data is stored in the Latest folder. Thus, the user is allowed to easily find the latest scanned image data.

Further, when determining that a signal corresponding to pressing of the start button 452 has been input (S5: Yes), the CPU 32 determines whether the transfer flag is "ON" (S9). When determining that the transfer flag is not "ON" (S9: No), the CPU 32 determines that the pressing of the start button 452 is not the first pressing of the start button 452 after the network I/F 44 has begun to communicate with the server 5, and therefore skips S50 and S51. Thereby, in a procedure from when the CPU 32 executes S7 for the second time after the network I/F 44 has begun to communicate with the server 5, even when there is an image file stored in the Latest folder, the image file stored in the Latest folder is not transferred. Thus, when the user wishes to save a plurality of image files in the Latest folder, one or more image files of image data scanned after the network I/F 44 has begun to communicate with the server 5 may be stored and accumulated in the Latest folder. Therefore, the third illustrative embodiment provides such a user-friendly document scanning apparatus 1.

[Storing Process in Fourth Illustrative Embodiment]

Figure 9A:
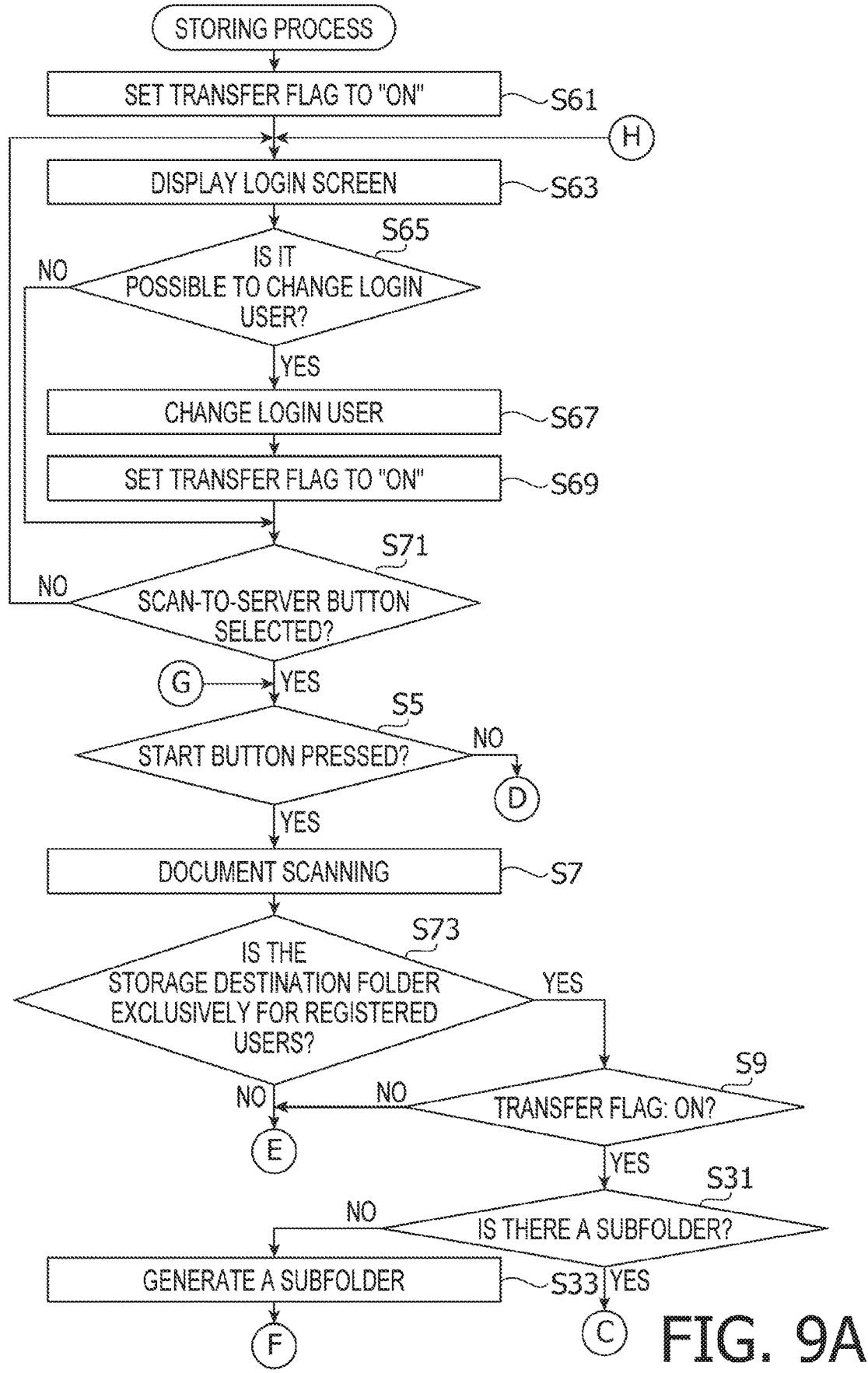
FIGS. 9A and 9B are flowcharts showing a procedure of a storing process in a fourth illustrative embodiment according to one or more aspects of the present disclosure.
Figure 9B:
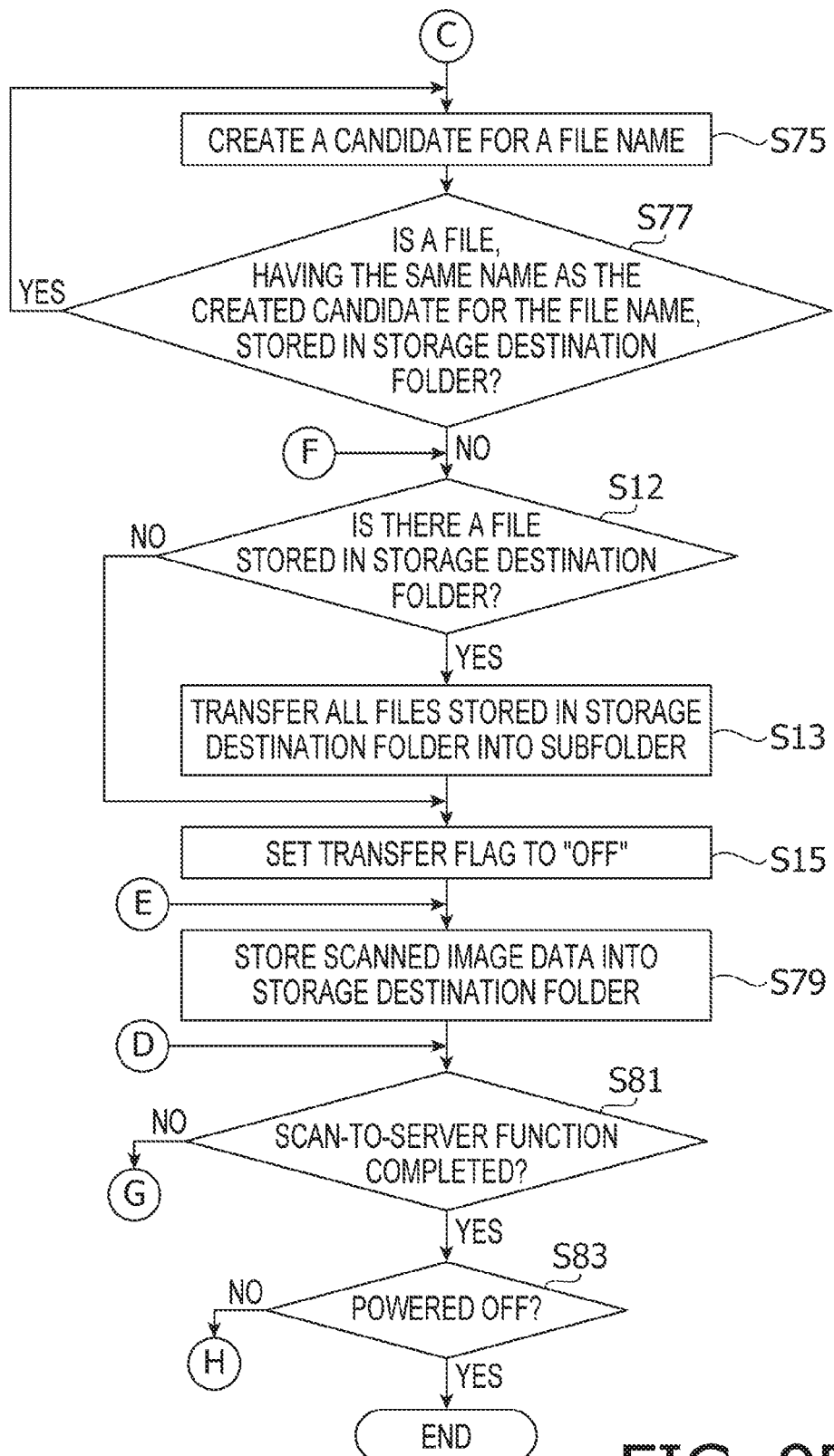

Referring to FIGS. 9A and 9B, a storing process in a fourth illustrative embodiment according to aspects of the present disclosure will be described. In the following description, substantially the same steps as exemplified in the aforementioned first illustrative embodiment will be provided with the same reference characters, and detailed explanations thereof may be omitted.

When the document scanning apparatus 1 is powered on, the CPU 32 sets a transfer flag to "ON" (S61). Then, the CPU 32 displays a login screen (not shown) on the LCD 41 (S63). In the fourth illustrative embodiment, the transfer flag is used for the CPU 32 to determine whether pressing of the start button 452 is the first pressing of the start button 452 after execution of a login process in S67. The login screen includes text boxes displayed thereon to accept a user name and a password. When wishing to log in to the document scanning apparatus 1, the user inputs a user name and a password, and presses the OK button. Next, the CPU 32 determines whether the CPU 32 is allowed to change the login user (S65). Specifically, when determining that a user name and a password have been input on the login screen, and then the OK button has been pressed, the CPU 32 collates the input values with the authentication information 51 stored in the NVRAM 35. At this time, when determining that the authentication information 51 contains information coincident with the user name and the password input via the login screen, the CPU 32 determines that the CPU 32 is allowed to change the login user (S65: Yes). Meanwhile, when determining that the authentication information 51 does not contain information coincident with the user name and the password input via the login screen, the CPU 32 determines that the CPU 32 is not allowed to change the login user (S65: No). Further, when determining that the menu button 451 has been pressed after displaying the login screen on the LCD 41, the CPU 32 determines that the CPU 32 is not allowed to change the login user (S65: No). It is noted that the authentication information 51 contains one or more user names each registered in association with a corresponding password. Hereinafter, the one or more user names contained in the authentication information 51 may be referred to as "one or more registered users." For instance, the authentication information 51 is used when availability of a function of the document scanning apparatus 1 depends on which user is logging in to the apparatus 1. In other words, in a case where a specific function of the document scanning apparatus 1 is permitted to be used only by a specific registered user, when the specific registered user wishes to use the specific function, the specific registered user needs to log in to the document scanning apparatus 1 before using the specific function.

When determining that the CPU 32 is allowed to change the login user (S65: Yes), the CPU 32 changes the login user to a registered user who is authorized by the successful authentication using the user name and the password input via the login screen (S67). Subsequently, the CPU 32 sets the transfer flag to "ON" (S69), and then displays a function selecting screen on the LCD 41. Afterward, the CPU 32 goes to S71. Meanwhile, when determining that the CPU 32 is not allowed to change the login user (S65: No), the CPU 32 displays the function selecting screen without changing the login user, and goes to S71. The user may select the Scan-to-Server button. In S71, the CPU 32 determines whether the Scan-to-Server button has been selected. When determining that the Scan-to-Server button has not been selected (S71: No), the CPU 32 goes back to S63. Meanwhile, when determining that the Scan-to-Server button has been selected (S71: Yes), the CPU 32 determines whether the start button 452 has been pressed (S5). When determining that the start button 452 has not been pressed (S5: No), the CPU 32 goes to S81. Meanwhile, when determining that the start button 452 has been pressed (S5: Yes), the CPU 32 controls the image scanner 38 to scan document sheets P, thereby generating scanned image data (S7). Subsequently, the CPU 32 determines whether the User folder as a storage destination folder is exclusively for the one or more registered users (S73). Specifically, the CPU 32 controls the network I/F 44 to transmit, to the server 5, an instruction for inquiring of the server 5 whether the User folder is accessible exclusively to one or more limited users. Next, the CPU 32 controls the network I/F 44 to receive, from the server, limitation information representing whether the User folder is accessible exclusively to one or more limited users. When the limitation information represents that the User folder is accessible exclusively to one or more limited users, the CPU 32 determines that the User folder is exclusively for the one or more registered users (S73: Yes). Meanwhile, when the limitation information represents that the User folder is accessible to any user, the CPU 32 determines that the User folder is not exclusively for the one or more registered users (S73: No).

When determining that the User folder is not exclusively for the one or more registered users (S73: No), the CPU 32 goes to S79. Meanwhile, when determining that the User folder is exclusively for the one or more registered users (S73: Yes), the CPU 32 determines whether the transfer flag is "ON" (S9). When determining that the transfer flag is not "ON" (S9: No), the CPU 32 goes to S79. Meanwhile, when determining that the transfer flag is "ON" (S9: Yes), the CPU 32 determines whether there is an Old folder as a subfolder in the User folder (S31). It is noted that, in the fourth illustrative embodiment, the CPU 32 causes the server 5 to structure a folder configuration having an Old folder under the User folder. In the User folder, latest scanned image data is stored. In the Old folder, past scanned image data is stored. When determining that there is an Old folder as a subfolder in the User folder (S31: Yes), the CPU 32 goes to S75. Meanwhile, when determining that there is not an Old folder (S31: No), the CPU 32 causes the server 5 to create an Old folder as a subfolder in the User folder as a storage destination folder (S33). Thereafter, the CPU 32 goes to S12.

In S75 (see FIG. 9B), the CPU 32 creates a candidate for a file name by adding a particular file number to a date. Specifically, the CPU 32 sets, as the particular file number for the candidate for the file name, a number obtained by adding one to a latest file number stored in the NVRAM 35. Further, the CPU 32 stores the latest file number, which is newly set as the particular file number for the candidate for the file name, into the NVRAM 35. Next, the CPU 32 determines whether an image file having the same name as the newly-created candidate for the file name is stored in the User folder (S77). Specifically, the CPU 32 controls the network I/F 44 to transmit, to the server 5, an instruction to transmit data name information containing file names of image files stored in the Old folder. Subsequently, the CPU 32 controls the network I/F 44 to receive the data name information from the server 5. Then, the CPU 32 determines whether the newly-created candidate for the file name is contained in the data name information. When determining that the newly-created candidate for the file name is contained in the data name information, the CPU 32 determines that an image file having the same name as the newly-created candidate for the file name is stored in the User folder (S77: Yes). Meanwhile, when determining that the newly-created candidate for the file name is not contained in the data name information, the CPU 32 determines that no image file having the same name as the newly-created candidate for the file name is stored in the User folder (S77: No).

When determining that an image file having the same name as the newly-created candidate for the file name is stored in the User folder (S77: Yes), the CPU 32 goes back to S75. Thus, by repeatedly executing S75 and S77 until determining that no image file having the same name as the newly-created candidate for the file name is stored in the User folder, the CPU 32 creates a file name that is not shared by any image file stored in the Old folder. When determining that no image file having the same name as the newly-created candidate for the file name is stored in the User folder (S77: No), the CPU 32 determines whether there is an image file stored in the User folder as a storage destination folder (S12). When determining that there is not an image file stored in the User folder (S12: No), the CPU 32 goes to S15. Meanwhile, when determining that there is an image file stored in the User folder (S12: Yes), the CPU 32 transfers all image files stored in the User folder into the Old folder (S13). Next, the CPU 32 sets the transfer flag to "OFF" (S15). Subsequently, the CPU 32 generates an image file of the scanned image data stored in the scanned-image storing area 352, and stores the generated image file provided with the file name created in S75, into the User folder (S79). Next, the CPU 32 determines whether the Scan-to-Server function has been completed (S81). Specifically, when determining that the menu button 451 has been pressed, the CPU 32 determines that the Scan-to-Server function has been completed (S81: Yes). Meanwhile, when determining that the menu button 451 has not been pressed, the CPU 32 determines that the Scan-to-Server function has not been completed (S81: No). When determining that the Scan-to-Server function has not been completed (S81: No), the CPU 32 goes back to S5 to scan a next set of document sheets P. Meanwhile, when determining that the Scan-to-Server function has been completed (S81: Yes), the CPU 32 determines whether the document scanning apparatus 1 has been powered off (S83). When determining that the document scanning apparatus 1 has not been powered off (S83: No), the CPU 32 goes back to S63. Meanwhile, when determining that the document scanning apparatus 1 has been powered off (S83: Yes), the CPU 32 terminates the storing process.

The aforementioned fourth illustrative embodiment provides the following advantageous effects. When determining that the start button 452 has been pressed (S5: Yes), the CPU 32 determines whether the transfer flag is "ON" (S9). When determining that the transfer flag is not "ON" (S9: No), the CPU 32 determines that the pressing of the start button 452 is not the first pressing of the start button 452 after execution of the login process in S67, and skips S12 and S13. Thereby, in a procedure from when the CPU 32 executes S7 for the second time after execution of the login process, even when there is an image file stored in the User folder, the image file stored in the User folder is not transferred. Thus, when the user wishes to save a plurality of image files in the User folder, one or more image files of image data scanned after execution of the login process may be stored and accumulated in the User folder. Therefore, the fourth illustrative embodiment provides such a user-friendly document scanning apparatus 1.

Further, in S73, the CPU 32 controls the network I/F 44 to transmit, to the server 5, an instruction for inquiring of the server 5 whether the User folder is accessible exclusively to one or more limited users, and controls the network I/F 44 to receive the limitation information from the server 5. Further, when the limitation information represents that the User folder is accessible to any user (S73: No), the CPU 32 skips S12 and S13 in a procedure after execution of S7. Assuming that the CPU 32 executes S13 in a case where the User folder is accessible to any user, for instance, when the CPU 32 executes S79 in response to operations by a user B after the CPU 32 executes S79 in response to operations by a user A, an image file stored in response to the operations by the user A is transferred into the Old folder. Nonetheless, in the aforementioned fourth illustrative embodiment, the CPU 32 skips S12 and S13 when the User folder is accessible to any user. Thus, it is possible to prevent a user-ungraspable image file from being transferred from User folder to the Old folder.

Further, in S77, the CPU 32 controls the network I/F 44 to transmit, to the server 5, an instruction to transmit the data name information containing file names of image files stored in the User folder, and controls the network I/F 44 to receive the data name information from the server 5. Further, by executing S75 and S77, the CPU 32 creates a file name that is different from the file names contained in the data name information. Further, in S79, the CPU 32 stores an image file of scanned image data provided with a file name created in S75. Thereby, even when a user-ungraspable image file having the same name as created in S75 is stored in the Old folder, the CPU 32 certainly stores, into the User folder, an image file of latest scanned image data provided with a different file name recreated in S75 while maintaining the user-ungraspable image file stored in the Old folder.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Modifications

In the aforementioned fourth illustrative embodiment, when the limitation information represents that the User folder is accessible to any user (S73: No), the CPU 32 skips S12 and S13 in the procedure after execution of S7. Nonetheless, for instance, when the limitation information represents that the User folder is accessible to any user (S73: No), the CPU 32 may execute S12 and S13 in the procedure after execution of S7. Further, when the limitation information represents that the User folder is accessible exclusively to one or more limited users (S73: Yes), the CPU 32 may skip S12 and S13 in the procedure after execution of S7. When the User folder is accessible exclusively to one or more limited users, the User folder is used only by the one or more limited users. In this case, even though the CPU 32 does not execute S12 or S13, since all image files stored in the User folder are data of the one or more limited users, it is likely that each of the one or more limited users may easily find an intended image file. Meanwhile, when the User folder is accessible to any user, it is likely that a lot of users use the User folder as a storage destination folder. In this case, when the CPU 32 executes S12 and S13, old image files are transferred into the Old folder, and a latest image file is stored into the User folder. Therefore, each user may easily find an intended image file.

In the aforementioned second illustrative embodiment, when determining that a file name of an image file stored in the User folder is coincident with a file name of a target image file stored in the Latest folder (S43: Yes), in S45, the CPU 32 creates a file name that is not shared by any image file stored in the User folder, as a new file name of the target image file stored in the Latest folder. The same method may be applied to the aforementioned first and third illustrative embodiments. For instance, in the first illustrative embodiment, when determining that there is an image file stored in the User folder (S12: Yes), the CPU 32 may set, as a target image file, an image file stored in the User folder, and may determine whether an image file having the same name as a file name of the target image file is stored in the Old folder (S43). Specifically, the CPU 32 may control the USB OF 42 to transmit, to the USB memory 6, an instruction to transmit data name information containing file names of image files stored in the User folder and the Old folder. Next, the CPU 32 may control the USB OF 42 to receive the data name information from the USB memory 6. Subsequently, based on the received data name information, the CPU 32 may determine whether an image file, having the same name as the file name of the target image file stored in the User folder, is stored in the Old folder. When determining that an image file having the same name as the file name of the target image file is stored in the Old folder (S43: Yes), the CPU 32 may create a new file name of the target image file that is not shared by any image file stored in the Old folder, and may transfer, into the Old folder, the target image file provided with the new file name.

In the aforementioned fourth illustrative embodiment, by executing S75 and S77, the CPU 32 creates a file name that is not coincident with any file name contained in the data name information. Further, in S79, the CPU 32 stores, into the User folder, an image file provided with the file name created in S75. The same method may be applied to the aforementioned second and third illustrative embodiments. For instance, in the second illustrative embodiment, before execution of S49, the CPU 32 may control the USB OF 42 to transmit, to the USB memory 6, an instruction to transmit data name information containing file names of image files stored in the User folder. Next, the CPU 32 may control the USB OF 42 to receive the data name information from the USB memory 6. Subsequently, the CPU 32 may determine whether the same name as a created candidate for a file name is contained in the data name information. When determining that an image file having the same name as the created candidate is stored in the User folder, the CPU 32 may create a file name that is not shared by any image file stored in the User folder. In S49, the CPU 32 may store, into the Latest folder, an image file of the scanned image data provided with the created file name.

In the aforementioned second illustrative embodiment, in S45, the CPU 32 renames the target image file stored in the Latest folder. Nonetheless, the CPU 32 may rename an image file stored in the User folder, instead of renaming the target image file stored in the Latest folder.

Further, for instance, in the storing process of the aforementioned third illustrative embodiment, the CPU 32 may execute S53 immediately after execution of S11. Further, for instance, in the storing process of the aforementioned fourth illustrative embodiment, the CPU 32 may execute S75 and S77 after execution of S12 and S13.

In the aforementioned illustrative embodiments, a file name to be provided to an image file of the scanned image data is a numerical string including a date and a file number (i.e., a 3-digit natural number). Nonetheless, the method for creating the file name may not necessarily be limited to the above method.

In the aforementioned illustrative embodiments, aspects of the present disclosure are applied to the document scanning apparatus 1. Nonetheless, aspects of the present disclosure may be applied, for instance, to an apparatus having a plurality of functions such as a printing function and a facsimile function as well as an image scanning function.

Associations between elements exemplified in the aforementioned illustrative embodiments and elements according to aspects of the present disclosure will be exemplified below. The document scanning apparatus 1 may be an example of a "document scanning apparatus" according to aspects of the present disclosure. The image scanner 38 may be an example of an "image scanner" according to aspects of the present disclosure. The USB I/F 42 may be an example of a "communication interface" according to aspects of the present disclosure. Further, the network I/F 44 may be an example of the "communication interface" according to aspects of the present disclosure. The CPU 32 and the ROM 34 storing the programs 34A may be included in a "controller" according to aspects of the present disclosure. The USB receptacle 43 may be an example of an "attachment outlet" according to aspects of the present disclosure. The USB memory 6 may be an example of a "storage" according to aspects of the present disclosure. Further, the server 5 may be an example of the "storage" according to aspects of the present disclosure. The menu button 451 may be an example of a "selection key" according to aspects of the present disclosure. The start button 452 may be an example of a "start key" according to aspects of the present disclosure. A sequence of the steps S7 to S17 in the aforementioned first illustrative embodiment may be an example of a "scanned-data storing process" according to aspects of the present disclosure. Further, a sequence of the steps S7 to S49 in the aforementioned second illustrative embodiment may be an example of the "scanned-data storing process" according to aspects of the present disclosure. Further, a sequence of the steps S7 to S55 in the aforementioned third illustrative embodiment may be an example of the "scanned-data storing process" according to aspects of the present disclosure. Further, a sequence of the steps S7 to S79 in the aforementioned fourth illustrative embodiment may be an example of the "scanned-data storing process" according to aspects of the present disclosure.

What is claimed is:

1. A document scanning apparatus comprising:
an image scanner;
a communication interface configured to communicate with a storage; and
a controller configured to perform a scanned-data storing process comprising:
  in response to accepting a start instruction to start the scanned-data storing process, performing a scanning process to control the image scanner to scan a document sheet, thereby generating scanned image data;
  determining whether the accepted start instruction is a first start instruction after a particular process has been performed;
  in response to determining that the accepted start instruction is the first start instruction after the particular process has been performed, performing:
    a first transmitting process to control the communication interface to transmit, to the storage, an instruction for inquiring of the storage whether there is one or more pieces of image data stored in a first folder of the storage;
    a first receiving process to control the communication interface to receive, from the storage, data existence information representing whether there is one or more pieces of image data stored in the first folder;
    a second transmitting process to, when the data existence information represents that there is one or more pieces of image data stored in the first folder, control the communication interface to transmit, to the storage, an instruction to remove the one or more pieces of image data from the first folder; and
    a data storing process to control the communication interface to transmit, to the storage, an instruction to store the scanned image data generated by the image scanner, into the first folder, and
  in response to determining that the accepted start instruction is not the first start instruction after the particular process has been performed, performing the data storing process without performing the first transmitting process, the first receiving process, or the second transmitting process.

2. The document scanning apparatus according to claim 1, wherein the controller is further configured to perform:
  the second transmitting process comprising:
    controlling the communication interface to transmit, to the storage, an instruction to transfer the removed one or more pieces of image data into a second folder, the second folder being a subfolder of the first folder.

3. The document scanning apparatus according to claim 2, wherein, in the scanned-data storing process, the controller is further configured to, in advance of the second transmitting process, perform:
  a third transmitting process to, control the communication interface to transmit, to the storage, an instruction for inquiring of the storage whether the second folder exists as the subfolder of the first folder;
  a second receiving process to control the communication interface to receive, from the storage, subfolder information representing whether the second folder exists as the subfolder of the first folder; and
  a fourth transmitting process to, in response to determining that the subfolder information represents that the second folder does not exist as the subfolder of the first folder, control the communication interface to transmit, to the storage, an instruction to generate the second folder as the subfolder of the first folder.

4. The document scanning apparatus according to claim 2, wherein the controller is further configured to, in the scanned-data storing process, perform:
  a third transmitting process to control the communication interface to transmit, to the storage, an instruction to transmit data name information containing one or more data names of image data stored in the second folder as the subfolder of the first folder;
  a second receiving process to control the communication interface to receive the data name information from the storage;
  a creating process to create a data name that is different from any of the one or more data names contained in the data name information; and
  the data storing process comprising:
    controlling the communication interface to transmit, to the storage, an instruction to store the scanned image data provided with the created data name, into the first folder.

5. The document scanning apparatus according to claim 2, wherein, in the scanned-data storing process, the controller is further configured to, in advance of the data storing process, perform:
  a third transmitting process to control the communication interface to transmit, to the storage, an instruction to transmit data name information containing one or more data names of image data stored in the first folder and the second folder;
  a second receiving process to control the communication interface to receive the data name information from the storage;
  a determining process to determine whether a data name of image data stored in the first folder is coincident with a data name of image data stored in the second folder, with respect to each of the one or more pieces of image data stored in the first folder, based on the received data name information;
  a renaming process to, in response to determining that a data name of specific image data stored in the first folder is coincident with a data name of image data stored in the second folder, create a new data name of the specific image data, the new data name being different from a data name of any image data stored in the second folder; and
  the second transmitting process further comprising:
    controlling the communication interface to transmit, to the storage, an instruction to transfer the specific image data provided with the created new data name, into the second folder.

6. The document scanning apparatus according to claim 1, wherein the controller is further configured to perform:
  the second transmitting process comprising:
    controlling the communication interface to transmit, to the storage, an instruction to transfer the removed one or more pieces of image data into a second folder, the second folder having the first folder as a subfolder of the second folder.

7. The document scanning apparatus according to claim 6, wherein, in the scanned-data storing process, the controller is further configured to, in advance of the second transmitting process, perform:
  a third transmitting process to, control the communication interface to transmit, to the storage, an instruction for inquiring of the storage whether the first folder exists as the subfolder of the second folder;

a second receiving process to control the communication interface to receive, from the storage, subfolder information representing whether the first folder exists as the subfolder of the second folder; and a fourth transmitting process to, in response to determining that the subfolder information represents that the first folder does not exist as the subfolder of the second folder, control the communication interface to transmit, to the storage, an instruction to generate the first folder as the subfolder of the second folder.

8. The document scanning apparatus according to claim 6, wherein the controller is further configured to, in the scanned-data storing process, perform:

a third transmitting process to control the communication interface to transmit, to the storage, an instruction to transmit data name information containing one or more data names of image data stored in the second folder;

a second receiving process to control the communication interface to receive the data name information from the storage;

a creating process to create a data name that is different from any of the one or more data names contained in the data name information; and the data storing process comprising:
controlling the communication interface to transmit, to the storage, an instruction to store the scanned image data provided with the created data name, into the first folder as the subfolder of the second folder.

9. The document scanning apparatus according to claim 6, wherein, in the scanned-data storing process, the controller is further configured to, in advance of the data storing process, perform:

a third transmitting process to control the communication interface to transmit, to the storage, an instruction to transmit data name information containing one or more data names of image data stored in the first folder and the second folder;

a second receiving process to control the communication interface to receive the data name information from the storage;

a determining process to determine whether a data name of image data stored in the first folder is coincident with a data name of image data stored in the second folder, with respect to each of the one or more pieces of image data stored in the first folder, based on the received data name information;

a renaming process to, in response to determining that a data name of specific image data stored in the first folder is coincident with a data name of image data stored in the second folder, create a new data name of the specific image data, the new data name being different from a data name of any image data stored in the second folder; and the second transmitting process further comprising:
controlling the communication interface to transmit, to the storage, an instruction to transfer the specific image data provided with the created new data name, into the second folder.

10. The document scanning apparatus according to claim 1,
wherein the controller is further configured to perform:
the second transmitting process comprising:
controlling the communication interface to transmit, to the storage, an instruction to delete the removed one or more pieces of image data, the second folder having the first folder as a subfolder of the second folder.

11. The document scanning apparatus according to claim 10,
wherein, in the scanned-data storing process, the controller is further configured to, in advance of the second transmitting process, perform:

a third transmitting process to, control the communication interface to transmit, to the storage, an instruction for inquiring of the storage whether the first folder exists as the subfolder of the second folder;

a second receiving process to control the communication interface to receive, from the storage, subfolder information representing whether the first folder exists as the subfolder of the second folder; and a fourth transmitting process to, in response to determining that the subfolder information represents that the first folder does not exist as the subfolder of the second folder, control the communication interface to transmit, to the storage, an instruction to generate the first folder as the subfolder of the second folder.

12. The document scanning apparatus according to claim 10,
wherein the controller is further configured to, in the scanned-data storing process, perform:

a third transmitting process to control the communication interface to transmit, to the storage, an instruction to transmit data name information containing one or more data names of image data stored in the second folder;

a second receiving process to control the communication interface to receive the data name information from the storage;

a creating process to create a data name that is different from any of the one or more data names contained in the data name information; and the data storing process comprising:
controlling the communication interface to transmit, to the storage, an instruction to store the scanned image data provided with the created data name, into the first folder as the subfolder of the second folder.

13. The document scanning apparatus according to claim 1, further comprising:
an attachment outlet to which the storage is attached; and
a start key configured to, in response to accepting a start instruction to start the scanned-data storing process, issue the start instruction to the controller, wherein the particular process is the storage being attached to the attachment outlet.

14. The document scanning apparatus according to claim 1, further comprising:
a start key configured to, in response to accepting a start instruction to start the scanned-data storing process, issue the start instruction to the controller, wherein the particular process is the communication interface beginning communication with the storage.

15. The document scanning apparatus according to claim 1, further comprising:
   a selection key configured to, in response to accepting selection of the scanned-data storing process, issue a selection signal to the controller; and
   a start key configured to, in response to accepting a start instruction to start the scanned-data storing process, issue the start instruction to the controller, wherein the particular process is receipt of the selection signal.

16. The document scanning apparatus according to claim 1, further comprising:
   a start key configured to, in response to accepting a start instruction to start the scanned-data storing process, issue the start instruction to the controller, wherein the particular process is an execution of a login process for a user to log in to the document scanning apparatus.

17. The document scanning apparatus according to claim 1,
   wherein the scanned-data storing process further comprises:
      a third transmitting process to, in advance of the first transmitting process, control the communication interface to transmit, to the storage, an instruction for inquiring of the storage whether the first folder is accessible exclusively to one or more limited users;
      a second receiving process to control the communication interface to receive, from the storage, limitation information representing whether the first folder is accessible exclusively to the one or more limited users; and
      in response to determining that the limitation information represents that the first folder is accessible to any user, skipping the first transmitting process, the first receiving process, and the second transmitting process in the scanned-data storing process.

18. The document scanning apparatus according to claim 1,
   wherein the scanned-data storing process further comprises:
      a third transmitting process to, in advance of the first transmitting process, control the communication interface to transmit, to the storage, an instruction for inquiring of the storage whether the first folder is accessible exclusively to one or more limited users;
      a second receiving process to control the communication interface to receive, from the storage, limitation information representing whether the first folder is accessible exclusively to the one or more limited users; and
      in response to determining that the limitation information represents that the first folder is accessible exclusively to the one or more limited users, skipping the first transmitting process, the first receiving process, and the second transmitting process in the scanned-data storing process.

19. A method implementable on a processor coupled with a document scanning apparatus, the document scanning apparatus comprising an image scanner and a communication interface configured to communicate with a storage, the method comprising:
   controlling the image scanner to scan a document sheet in response to accepting a start instruction to start a scanned-data storing, thereby generating scanned image data;
   determining whether the accepted start instruction is a first start instruction after a particular process has been performed;
   in response to determining that the accepted start instruction is the first start instruction after the particular process has been performed:
      controlling the communication interface to transmit, to the storage, an instruction for inquiring of the storage whether there is one or more pieces of image data stored in a specific folder of the storage;
      controlling the communication interface to receive, from the storage, data existence information representing whether there is one or more pieces of image data stored in the specific folder;
      when the data existence information represents that there is one or more pieces of image data stored in the specific folder, controlling the communication interface to transmit, to the storage, an instruction to remove the one or more pieces of image data from the specific folder; and
      controlling the communication interface to transmit, to the storage, an instruction to store the scanned image data generated by the image scanner, into the specific folder, and
   in response to determining that the accepted start instruction is not the first start instruction after the particular process has been performed, the data is stored without:
      inquiring of the storage whether there is one or more pieces of image data stored in a specific folder of the storage,
      receiving data existence information representing whether there is one or more pieces of image data stored in the specific folder, or
      transmitting an instruction to remove the one or more pieces of image data from the specific folder.

20. A non-transitory computer-readable medium storing computer-readable instructions that are executable by a processor coupled with a document scanning apparatus, the document scanning apparatus comprising an image scanner and a communication interface configured to communicate with a storage, the instructions being configured to, when executed by the processor, cause the processor to perform a scanned-data storing process comprising:
   a scanning process to control the image scanner to scan a document sheet in response to accepting a start instruction to start a scanned-data storing, thereby generating scanned image data;
   determining whether the accepted start instruction is a first start instruction after a particular process has been performed;
   in response to determining that the accepted start instruction is the first start instruction after the particular process has been performed, performing:
      a first transmitting process to control the communication interface to transmit, to the storage, an instruction for inquiring of the storage whether there is one or more pieces of image data stored in a specific folder of the storage;
      a first receiving process to control the communication interface to receive, from the storage, data existence information representing whether there is one or more pieces of image data stored in the specific folder;
      a second transmitting process to, when the data existence information represents that there is one or more pieces of image data stored in the specific folder, control the communication interface to transmit, to the storage, an instruction to remove the one or more pieces of image data from the specific folder; and a data storing process to control the communication interface to transmit, to the storage, an instruction to store the scanned image data generated by the image scanner, into the specific folder, and in response to determining that the accepted start instruction is not the first start instruction after the particular process has been performed, performing the data storing process without performing the first transmitting process, the first receiving process, or the second transmitting process.

* * * * *

UNITED STATES PATENT AND TRADEMARK OFFICE
CERTIFICATE OF CORRECTION

PATENT NO. : 10,764,465 B2  
APPLICATION NO. : 15/934134  
DATED : September 1, 2020  
INVENTOR(S) : Shunsuke Yamamoto Page 1 of 1

It is certified that error appears in the above-identified patent and that said Letters Patent is hereby corrected as shown below:

On the Title Page

Page 2, item (56) References Cited, should read:  
FOREIGN PATENT DOCUMENTS  
JP     2008-177741 A     7/2008

Signed and Sealed this  
Eighth Day of December, 2020

Andrei Iancu  
*Director of the United States Patent and Trademark Office*